United States Patent

Kaminow

[15] 3,637,929
[45] Jan. 25, 1972

[54] OPTICAL SCANNING APPARATUS UTILIZING A RE-ENTRANT LASER BEAM

[72] Inventor: Ivan P. Kaminow, New Shrewsbury, N.J.
[73] Assignee: Bell Telephone Laboratories, Incorporated, Murray Hill, Berkeley Heights, N.J.
[22] Filed: Sept. 30, 1968
[21] Appl. No.: 763,778

[52] U.S. Cl. .............................. 178/7.3, 178/7.6, 250/199, 331/94.5
[51] Int. Cl. ...................... H04n 3/02, H01s 3/08, H04b 9/00
[58] Field of Search ............. 178/7.3 D, 5.4 BD, 7.88, 7.5 D, 178/7.6; 250/199, 229; 350/161, 160; 331/94.5

[56] References Cited

UNITED STATES PATENTS

| | | | |
|---|---|---|---|
| 3,303,276 | 2/1967 | Haeff | 178/5.4 |
| 3,488,102 | 1/1970 | Buck et al. | 178/7.6 |
| 3,437,954 | 4/1969 | Herriott et al. | 331/94.5 |
| 3,497,826 | 2/1970 | Foster | 331/94.5 |
| 3,498,693 | 3/1970 | Fein et al. | 178/7.6 |
| 3,503,671 | 3/1970 | Kompfner | 331/94.5 |

Primary Examiner—Robert L. Griffin
Assistant Examiner—John C. Martin
Attorney—R. J. Guenther and Arthur J. Torsiglieri

[57] ABSTRACT

In the synchronous scanning display device disclosed, the laser active medium and means for mode-locking multiple-mode laser oscillations are disposed in a resonator adapted to provide a folded optical path yielding a large plurality of resolvable spots at a reflector of stepped transmissity and reflectivity. The intensity of the output from the resonator at each spot is selectively controlled by a video signal applied to a broad area modulator disposed just outside the stepped-reflectivity reflector. Typically, an isolator is employed to produce unidirectional propagation of the laser radiation along the folded path.

5 Claims, 2 Drawing Figures

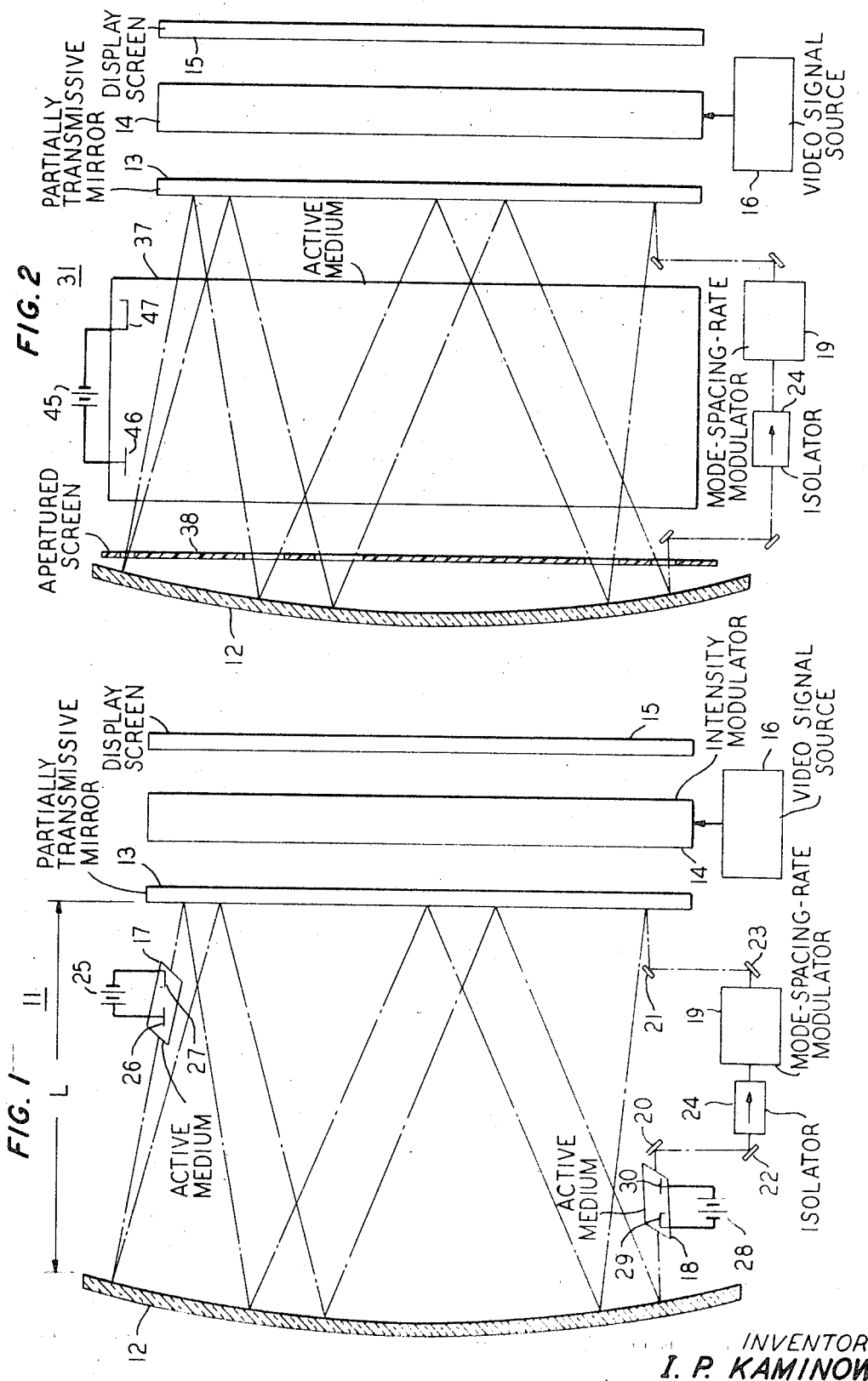

OPTICAL SCANNING APPARATUS UTILIZING A REENTRANT LASER BEAM

BACKGROUND OF THE INVENTION

This invention relates to optical scanners for coherent light, particularly those in which the active light source is intimately combined with the scanning apparatus.

In some previously proposed optical scanners that would be useful for scanning with coherent light, such as laser light, it has been recognized a single input optical pulse can be divided by a variety of techniques into a plurality of optical pulses directed along distinctive paths. Typically, these optical scanners have required a coherent light source, typically a pulsed laser, which is a self-contained unit that merely provides a pulsed output beam to the remainder of the scanning apparatus. A pulsed source has been found useful both for proposed optical pulse-code-modulation (PCM) communication and for improving resolution in some display applications.

I have recognized that substantially simpler scanning structures should be possible. In particular, it would be desirable to reduce the number of expensive optical reflectors required in the complete apparatus.

SUMMARY OF THE INVENTION

In accordance with my invention, synchronous display scanning is produced in a laser including means for mode-locking multiple-axial-mode oscillations by adapting the resonator to provide a folded optical path yielding a large number of resolvable spots at one reflector of the resonator. That one reflector is provided with graded transmissivity and reflectivity to pass substantially equal amplitude pulses from the spots along distinct output paths. Typically, the resonator is adapted to provide the plurality of optical paths by offsetting the laser active medium or media or the lowest loss path between the reflectors, from the common axis of the resonator reflectors. The reflectors are made much broader in area than the lateral dimensions of active media or the low-loss path. Moreover, at least one of the reflectors is curved to make a beam from the active medium to be nonnormal at incidence on that reflector and to direct the subsequent reflections of the beam in a reentrant folded path within the resonator.

BRIEF DESCRIPTION OF THE DRAWING

Further features and advantages of my invention will become apparent from the following detailed description taken together with the drawing, in which:

FIG. 1 is a partially pictorial and partially block diagrammatic illustration of a first embodiment of the invention; and FIG. 2 is a partially pictorial and partially block diagrammatic illustration of a modification of the embodiment of FIG. 1 in which the low-loss path is defined by irises.

DESCRIPTION OF ILLUSTRATIVE EMBODIMENT

In the illustrative embodiment of the drawing, the synchronous scanning laser 11 provides a spatial array of output light pulses in a repetitive sequence through graded (stepped) transmissivity areas of reflector 13 to a broad area intensity modulator 14. The portions of the pulses transmitted through modulator 14 appear as an image or display on display screen 15. If desired, focusing devices (not shown) may be employed between modulator 14 and screen 15 to reduce the spot size at screen 15.

An amplitude-modulated signal is applied to modulator 14 from a suitable signal source 16. Typically, the signal from source 16 may be of the type used for modulating the display intensity in an ordinary television set.

The scanning laser 11 includes the curved, substantially totally reflective reflector 12 as well as the graded transmissivity reflector 13. The mean radius of curvature of astigmatic reflector 12 is illustratively 5,000 cm.; and the separation of reflectors 12 and 13 is illustratively 2,500 cm. In this case, astigmatic reflector 12 is provided with a difference of radii of curvature in two orthogonal planes of a fraction of a centimeter. The facing surfaces of reflectors 12 and 13 have lateral dimensions of at least 250 cm. in each of two mutually orthogonal coordinates and may be either circular or square.

The laser 11 illustratively also includes two or more sections 17 and 18 of active medium having dispositions between reflectors 12 and 13 to insure that they intercept and are aligned with a common folded reentrant ray path. The diameter of each is small enough to intercept only a single beam segment. The lengths of the active medium sections 17 and 18 depend inversely on their effective laser gain per unit length and are chosen to be sufficient to insure multiple-mode laser oscillation in view of the excitation provided by respective excitation sources 25 and 28 through electrodes 26, 27 and 29, 30, as shown.

To provide pulsing at the mode spacing rate, $c/2NL$, an optical amplitude or phase modulator 19, energized and, operating at a frequency equal to, or a multiple of, that rate is disposed in a laterally displaced, peripheral segment of the folded ray path. The lateral displacement of this segment is provided for reasons of convenience in using a reasonably sized modulator and is implemented by the planar, small area, obliquely disposed reflectors 20 and 21 intercepting the original ray path segment and by the reflectors 22 and 23 obliquely disposed with respect to the displaced ray path to direct the light pulses through modulator 19 between reflectors 22 and 23.

Unidirectional traveling-wave oscillation in laser 11 is insured by an optical isolator 24, which illustratively may comprise a 45° Faraday polarization-rotator disposed between crossed polarizers. The active polarization-rotating material in isolator 24 might illustratively be lead glass, which is suitable for use with helium-neon laser sections 17 and 18 operating at 6,328 A. (1 A., Angstrom unit, equals $10^{-4}$ microns or $10^{-8}$ centimeters).

The active material of modulator 19 may be lithium tantalate employed with laterally disposed electrodes normal to its Z crystalline axis. The light is transmitted along the X crystalline axis. In this illustrative case the linear electro-optic effect is employed; and amplitude modulation is provided by disposing the active material between crossed polarizers. The signal source for modulator 19 is assumed to be a part thereof for the purpose of illustration and obviously would be connected between the electrodes.

In the formula for the mode-spacing rate $c/2NL$, $c$ is the velocity of light, L is the length of the resonator 11 and 2N is the number of segments in the folded ray path. In a practical laser 11, N will be of the order of several thousand; and the angles between ray path segments will be typically much smaller than those illustrated.

The large-area intensity modulator 14 may be a wide-area modulator or a mosaic of lithium tantalate electro-optic cells, each aligned with one of the output paths from laser 11. The entire mosaic of electro-optic cells is followed by a large-area polarizer to complete intensity modulator 14.

All of the polarizers in the components described above are mutually oriented to provide minimum attenuation for a light pulse propagating in the selected sense in laser 11 in the absence of signals applied to modulators 19 and 14.

The display screen 15 is illustratively of the ground-glass type conventional in the optical art.

The graded reflectivity of reflector 13 is provided by stepwise changes of the reflectivity and of the transmissivity of essentially rectangular areas thereon somewhat larger than the spot size of the incident coherent light pulse. The step changes in reflectivity and transmissivity vary monotonically in the same sequence as the sequence of incidences of the light pulse and are calculated to provide that equal-intensity portions of the pulse are transmitted through reflector 13 at each incidence. It may be noted that adjacent areas can differ by several steps of reflectivity, depending on the scanning pattern preferred by the attitudes of the active medium sections 17 and 18.

Various techniques are well known in the optical art for treating a reflector to provide selected reflectivity and transmissivity characteristics. Preparatory to use of any of these techniques, the sequence of reflectivity steps for the reflector are mapped and the values of the reflectivity steps are calculated to insure maintenance of oscillations and equal spot intensities. The calculations are straightforward.

In the operation of the embodiment of the drawing, the cooperation of reflectors 12 and 13 with the particularly disposed active medium sections 17 and 18, the modulator 19 and the isolator 24 is to promote multiple-mode unidirectional traveling-wave oscillation along the folded multiple-segment ray path passing through both active media sections. The path must be reentrant so that it closes on itself and retraces itself, in order for oscillations to occur. This adaptation also provides fixed disposition of the displayed spots on screen 15.

The amplitude modulation provided by modulator 19 mode-locks the multiple axial modes, thereby providing sequential pulses at the mode-spacing rate at spatially separated locations.

The display information is imparted to the sequentially incident pulses by modulator 14 in a sequence that appropriately corresponds to the scanning sequence of laser 11. Thus, the signal from source 16 varies sequentially between values corresponding to the desired intensities at areas of screen 15 upon which are imaged the areas of successively decreasing reflectivity of reflector 13.

The scanning period of the apparatus of the drawing is approximately the reciprocal of the above-described mode spacing rate. For $N=500\times500=2.5\times10^5$ spots, the scanning period is about one twenty-fifth of a second, which is appropriate for television scanning.

Several possible modifications are within the spirit of my invention. For example, a scanning laser according to my invention is readily adapted for multiple-channel optical pulse-code modulation (PCM) communication by replacing modulator 14 with $N$ separated modulators intercepting respective sequential output pulses and responding to the respective information signal sources of the different channels. Display screen 15 would be replaced by conventional arrays of partially transmissive reflectors for recombining the separate pulse streams of the separate channels for transmission in a common transmission path.

Moreover, in embodiments intended for display, screen 15 could be replaced by any other means for displaying some function of the relative intensities of the pulses. For example, reversible dyes exhibiting two distinct observable states could be employed. Such embodiments can be adapted for information storage.

In the modified embodiment of FIG. 2, components like those of FIG. 1 are numbered with the same numbers as in FIG. 1. The multiple sections of active medium are replaced by the broad area active medium 37 disposed between reflectors 12 and 13. In the case of the use of helium-carbon dioxide mixtures operating at 10.6 microns, such large tube diameters are practical, at the sacrifice of some gain. The display screen 15 may be an infrared-responsive fluorescent screen. The folded, reentrant, oscillation path is now defined by apertures in the screen 38, which is illustratively disposed near reflector 12 so that no oscillation can occur in a path shorter than that desired. For a helium-carbon dioxide active medium in the tube 37, the optical materials of components 24, 19 and 14 would be chosen to be suitable. The embodiment of FIG. 2 operates in essentially the same manner, in other respects, as the embodiment of FIG. 1.

I claim:

1. An optical scanning apparatus comprising a folded optical resonator including first and second reflectors, one of said reflectors being partially transmissive, a section of a laser active medium disposed between said reflectors in said resonator, said resonator with said medium being adapted to define between said reflectors a folded reentrant optical path having successive spots of incidence upon said partially transmissive reflector in a selected scanning sequence, and means disposed outside of said resonator for utilizing radiation emitted in sequence through said spots.

2. An apparatus according to claim 1 including means for energizing said active medium to enable coherent oscillations, said active medium and said energizing means being mutually adapted for promoting oscillations in multiple axial modes, and including means for mode-locking said oscillations, whereby pulses are emitted in succession through respective different ones of said spots on said partially transmissive reflector.

3. An apparatus according to claim 2 including optical isolation means disposed in said ray path in said resonator for promoting unidirectional propagation of said multiple modes, and in which the utilizing means comprises means disposed to intercept the emitted pulses of radiation for displaying an effect of their relative intensities and means disposed between the partially transmissive reflector and the displaying means for modulating the intensities of successive pulses.

4. An apparatus according to claim 1 in which the medium and the resonator are adapted to define the path in that the medium includes a plurality of sections offset from the axis of the resonator and aligned with different segments of the folded path.

5. An apparatus according to claim 1 in which the medium and the resonator are adapted to define the path in that the medium intercepts a plurality of segments of said folded path as well as the resonator axis, and the resonator includes a member apertured for the segments of the folded path and blocking oscillation in any path shorter than the folded path.

* * * * *